(12) United States Patent
Brune

(10) Patent No.: US 6,226,371 B1
(45) Date of Patent: May 1, 2001

(54) COMMUNICATION SYSTEM WITH ASSEMBLY CARRIER UNIT

(75) Inventor: Georg Brune, Hemer (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/282,822

(22) Filed: Mar. 31, 1999

(30) Foreign Application Priority Data

Mar. 31, 1998 (DE) .............................................. 198 14 435

(51) Int. Cl.$^7$ ................................................. H04M 1/00
(52) U.S. Cl. ......................... 379/165; 379/177; 379/156
(58) Field of Search .......................... 379/156, 164–165, 379/177, 182, 242–244, 265–266

(56) References Cited

U.S. PATENT DOCUMENTS 5,577,042 * 11/1996 McGraw, Sr. et al. .............. 370/257

* cited by examiner

Primary Examiner—Duc Nguyen
(74) Attorney, Agent, or Firm—Bell, Boyd & Lloyd LLC

(57) ABSTRACT

System-atypical plug-in locations are made available in a small system of an overall system series also comprising a mid-sized and, potentially a large system. These locations are supplied with signals in a different way than the system-specific plug-in locations. These signals and their handling by the system control are available in and of themselves in the corresponding system but are utilized in some other way. Additional plug-in locations are thus fashioned in a way that plug-in assemblies from the mid-sized and large systems can be utilized as peripheral assemblies. Solutions that are rarely applied can thus be realized in an economically justifiable way without complicated additional development. Performance features such as, for example, cordless integration, from a large system can thus be made directly available in a small system.

8 Claims, 1 Drawing Sheet

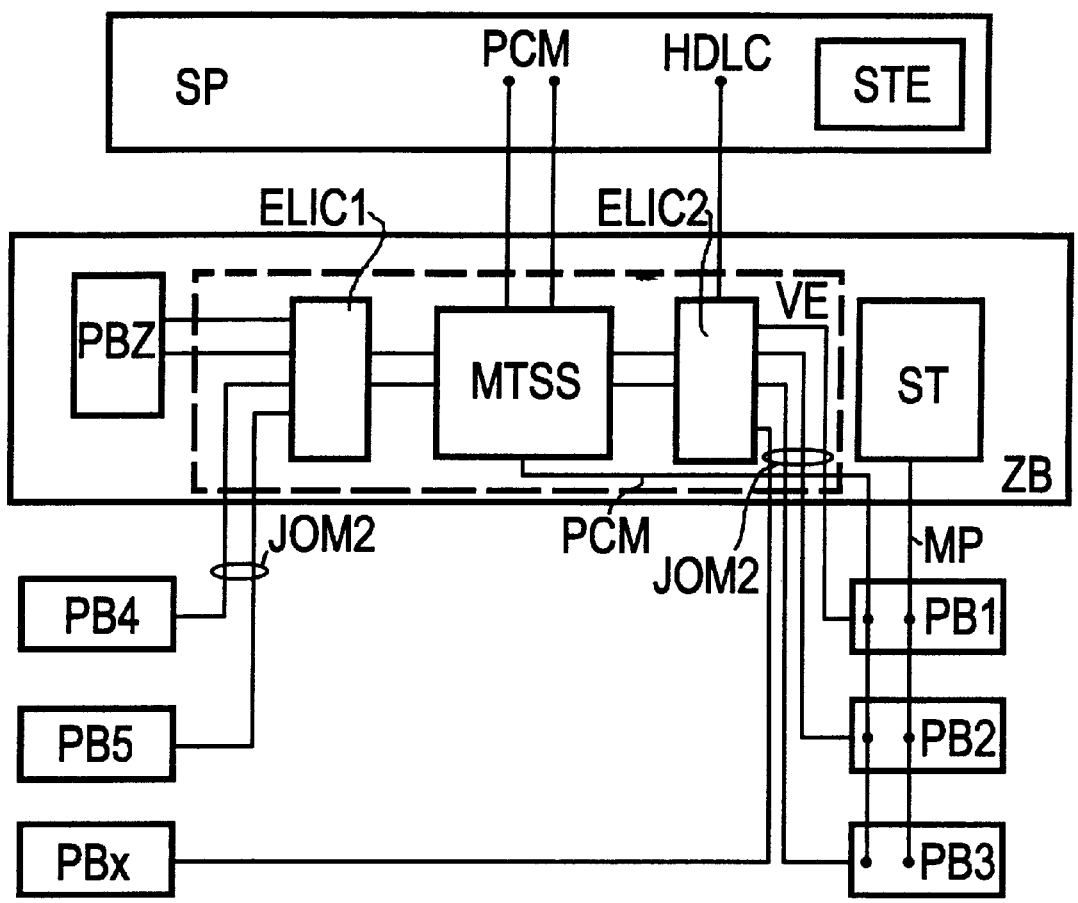

COMMUNICATION SYSTEM WITH ASSEMBLY CARRIER UNIT

BACKGROUND OF THE INVENTION

1. Field of the Invention

The present invention relates generally to the field of telecommunications. More specifically, the present invention is directed to an improved telecommunications system that provides enhanced compatibility among the systems.

2. Description of the Related Art

Conventional communication systems, particularly private branch exchange communication systems, employ a system software that essentially coincides for various versions of expansion. These are available as what are referred to as smaller or medium-sized enlarged communication systems of a system series. Each system within the system series classified in an ascending sequence given the approximately same system concept is in turn to be variably designed in view of the connection possibilities for subscriber lines and of the connection possibilities for special systems, particularly public systems.

The hardware platforms of these systems essentially differ on the basis of their structural format, the nature of the backplane wiring and on the basis of the format. For example, this may be the dimensions of the peripheral assemblies. This leads to the fact that, due to these differences, an assembly developed for specific functions of, for example, a medium-sized or, respectively, large system in this series cannot be utilized in what is referred to as a smaller system. Due to the differences in the dimension, in the interfaces and in the mechanical plug-type connectors, they must be newly developed platform-related. This relates, for example, to specific performance features and specific office or, respectively, data network accesses that, for example, are fundamentally present only for the more highly classified systems in the system series. This then leads to the fact that such specific solutions that are only provided for a limited number of such smaller systems can only be realized with a high cost.

SUMMARY OF THE INVENTION

One object of the invention is to overcome the above-mentioned shortcomings other objects and advantages of the present invention will become apparent from the following Summary and Detailed Description of the Preferred Embodiments. One aspect of the invention is comprised therein that a small system is designed so that of its hardware platform can flexibly accept system-atypical, peripheral assemblies from a different system of the system series. As a result of a corresponding, mechanical pre-performance, only a slight adaptation measure is still required for such an acceptance of an assembly. The resources, for example, PCM-oriented or, respectively, HDLC-oriented plug-in locations of the assembly to be introduced as needed from another system are fundamentally already present. As a result of this pre-performance, for example within coupling path accesses, a certain compatibility is thus already present.

The adaption outlay within an existing central assembly of the basic system that comprises a plug-in location for a system-atypical assembly is low since such an assembly from a "higher" system often usually comprises its own controller in addition to corresponding hardware parts, as a result whereof its software modules are correspondingly implemented.

Inventively, either plug-in locations that have become free due to a system variation in the form of the use of more highly integrated structural units of a central assembly or those that are optionally provided from the very outset are employed as additional plug-in locations for peripheral plug-in assemblies. Such plug-in assemblies of a higher system then serve the purpose of realizing a special service feature originally not available for the basic system. The platform-specific development for such a service feature that is otherwise necessary is thus eliminated since a corresponding assembly can be employed for a plurality of platforms.

Inventively, the additional plug-in locations are fashioned such in the view of the signaling supply that a few arbitrary plug-in assemblies from the repertoire of plug-in assemblies that are present in a system classified more highly within the system series can be additionally utilized in the sense of expanding the functionality of the system.

BRIEF DESCRIPTION OF THE DRAWINGS

FIG. 1 illustrates a schematic block diagram of an embodiment of the system of the present invention.

DETAILED DESCRIPTION OF THE PREFERRED EMBODIMENTS

An embodiment of the present invention is described with reference to FIG. 1. This embodiment of the communication system for switching of connected communication terminal equipment to one another and for the connection of such terminal equipment to communication networks contains a central assembly ZB. For example, the system may connect public networks via corresponding office accesses. Such a central assembly comprises, among other things, a controller ST comprised of a microprocessor, a memory and a clock. The system also comprises a switching unit VE.

The latter is comprised, for example, of two periphery-oriented telecommunication modules ELIC 1 and ELIC 2 as well as of a coupling module MTSS (memory time switch). The memory time switch MTSS respectively communicates with the periphery-oriented module ELIC via PCM-oriented interfaces, whereas communication of these components ELIC with the peripheral plug-in assemblies PB1 through PBx ensues via ISDN-oriented, internal interfaces IOM 2. Such a periphery-oriented module ELIC is system-independently equipped, so that it also fundamentally offers the possibility of an HDLC (high data link control) signaling for communication with other modules.

FIG. 1 also indicates the system structure of a communication system that, for example, as what is referred to as a small system, forms the basic system of a system family. This system family then also comprises "more highly" resonant systems within a predetermined sequence such as, for example, mid-sized and large systems. It can be provided for such a small communication system that, for example with respect to a minimum expansion level, periphery-oriented assemblies PBZ are also provided at the central assembly ZB. Further plug-in locations PB1 through PBx for peripheral plug-in assemblies are then also present for a maximum expansion level.

These plug-in locations or, respectively, the plug-in assemblies are system-specifically fashioned. They differ from the peripheral plug-in assemblies or, respectively, plug-in locations of a mid-sized and large system with respect to the dimensions, the interfaces and the mechanical plug-type connectors. When, for example, within the framework of a single-processor system, one wishes to utilize system-typically fashioned plug-in assemblies for specific functions already possible in the mid-sized and larger systems, this requires great expense. For complete integration in such an instance, all of the software required for this purpose would have to be introduced into the software of the central assembly ZB.

An example of such a desired expansion in the functionality is, for example, the possibility of being able to telephone via a mobile part upon incorporation of such a small communication system. The assembly for CMI (cordless maticell integration) present for mid-sized and large systems would thus have to be system-specifically developed for this small system. For example, this would require the necessary printed circuit board format and, thus, specific layout and the required software. Other examples are specific solutions for office accesses as required for certain countries and a plug-in card that enables the involvement into a local area network environment. The expansion of the functionality for a small communication system could also be comprised therein that subscriber assemblies will be required with an increase plurality of subscriber connections per assembly.

In order to avoid a separate development of these assemblies with respect to such expansions, it is now provided to fashion a plug-in location SP for system-atypical plug-in assemblies in the small communication system, these plug-in assemblies are already being utilized in mid-sized and large systems. The possibilities of an information transmission required for this purpose to this system-atypical assembly are already pre-performed in this small system. As indicated in FIG. 1, at least some of the system-typical plug-in assemblies are provided with a PCM signaling according to their complexity.

In order to increase the plurality of channels to be transmitted, individual assemblies among these system-typical assemblies also require the PCM connection in addition to the IOM 2 access. Further, some of these assemblies are connected to the controller via the microprocessor bus MP. For example, assembly identifiers and information that relate to connection data from an ISDN connection are communicated thereover. The plug-in location SP for a plug-in assembly from a different system of the system series also exhibits a higher plurality of periphery ports as system-atypical plug-in location for periphery plug-in assemblies compared to the system-typical plug-in locations, PB1 through PBx.

These plug-in assemblies cover specific functions as needed and comprise a separate controller STE due to their underlying complexity, since they originally belong to a multi-processor communication system. Given their inventive transfer into a basic system, i.e. into a small communication system, this provides the advantage that they need not be completely integrated since they already bring a majority of the functions along with them. Only a slight adaptation still has to be undertaken. The critical software part for such an assembly fundamentally runs on this assembly itself. The access to the switching unit VE ensues via a PCM connection that has already been pre-performed, via which the switching of the B-channels is undertaken.

The communication of the system-atypical periphery assembly to the existing central assembly ZB of the small system ensues with an HDLC link via the ELIC. This module has a corresponding terminal supporting the HDLC protocol. As a result of this possibility of transferring a peripheral plug-in assembly from a different system, solutions can also be realized that are only to be offered in small numbers of units. This is particularly interesting for "exotic office technologies", which could thus be used in a plurality of systems without a separate system-conforming plug-in assembly having to be developed for a small system for this purpose. In order to effect the connection to the respective plug-in assembly transferred from a different system, the corresponding coupling points for the communication merely have to be addressed by the system software. No additional expense is required for this purpose since both PCM connections as well as an HDLC connection are already present on the central assembly of the small system.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim as my invention:

1. In a communication systems series including a higher-order system and a lower-order system, said lower-order system being connectable to at least one of a plurality of system-typical peripheral devices, which are typical for use with said lower-order system, and having a system controller, the improvement comprising:

an assembly carrier unit in said lower-order system;

said assembly carrier having a plurality of plug receptacles respectively for said system typical peripheral devices for receiving control information from said system typical peripheral devices for processing by said system controller; and said assembly carrier having at least one further plug receptacle for a system-atypical plug-in assembly of said higher-order system, that is atypical for said lower-order system, for receiving control information from said system-atypical plug-in assembly which is different from said control information from said system-typical peripheral devices, for processing by said system controller.

2. A communication system series according to claim 1, wherein said at least one of said plug receptacles is employed as an additional plug-in location for peripheral plug-in assemblies.

3. A communication system series according to claim 1, wherein said at least one further plug receptacle is employed for providing a special feature that is available in a higher order system of the series.

4. A communication system series according to claim 1, wherein said assembly carrier unit has additional plus receptacles to receive plug-in assemblies from the higher-order system for expanding said lower-order system.

5. A communication system series according to claim 4, wherein said system-atypical plug-in assembly comprises a control unit which implements assembly-specific control functions.

6. A communication system according to claim 2, wherein said at least one further plug assembly is employed for providing a special service feature that is available in said higher order system of the series.

7. A communication system according to claim 2, wherein said carrier assembly has additional plug receptacles to receive plug-in assemblies from the higher-order system for expanding functionality of the lower-order system.

8. A communication system according to claim 3, wherein said carrier assembly has additional plug receptacles to receive plug-in assemblies from the higher-order system for expanding functionality of the lower-order system.

* * * * *